INVENTORS
DONALD C. FREEMAN
LOUIS H. ROGERS
BY Frederick J. McCarthy
ATTORNEY

United States Patent Office 3,672,841
Patented June 27, 1972

3,672,841
ANALYSIS OF ORGANIC AND INORGANIC WATER POLLUTANTS
Donald C. Freeman, Jr., Katonah, N.Y., and Louis J. Rogers, Stamford, Conn., assignors to Ionics Incorporated
Filed Dec. 14, 1970, Ser. No. 97,707
Int. Cl. G01n 33/18, 31/12; B01j 11/02
U.S. Cl. 23—230 PC        3 Claims

ABSTRACT OF THE DISCLOSURE

A method is provided for replenishing the catalyst component of an analyzer adapted to measure the total inorganic carbon content of a fluid sample.

Figure 1:
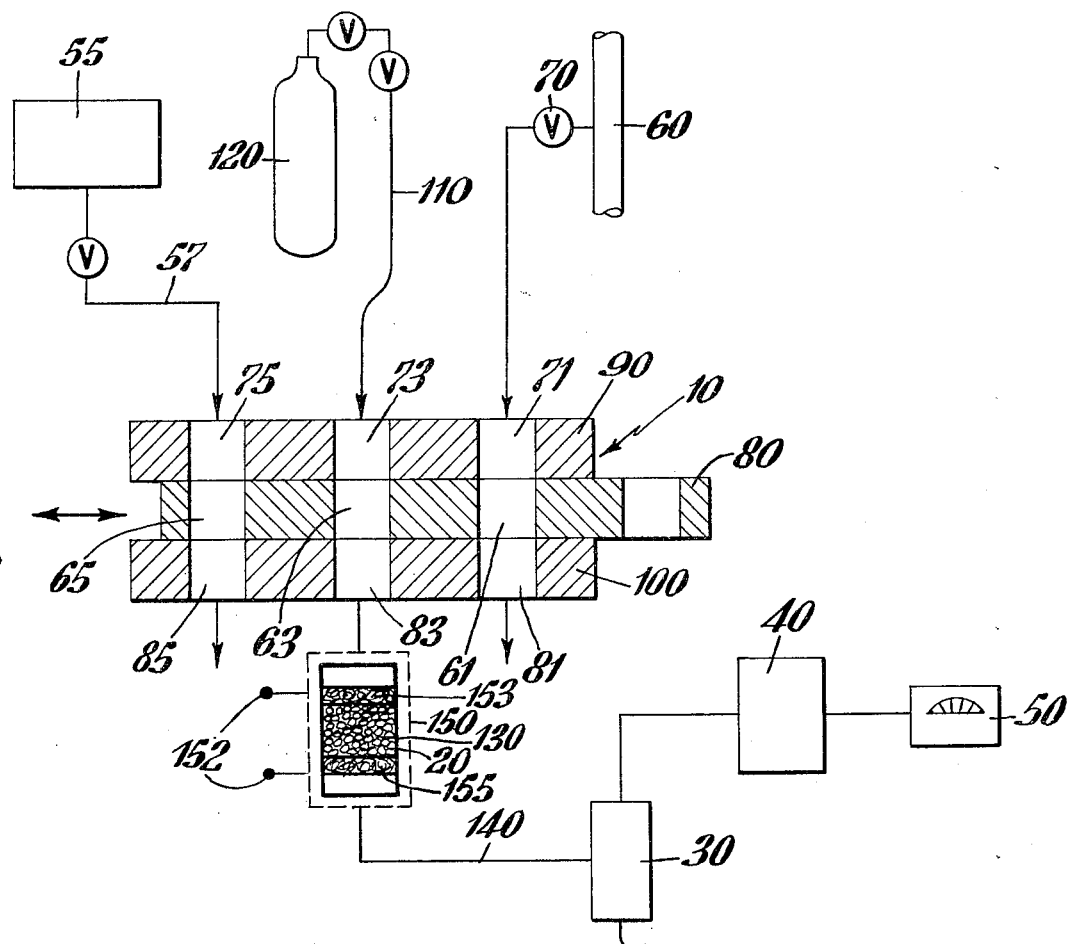

The need for water analysis has become increasingly important with expanding interest in the abatement of water pollution, and for determining leaks in vessels such as heat exchangers used in industry. One set of parameters of great utility has been the concentrations of carbon; organic, inorganic and total.

More specifically, in determining the total organic carbon (TOC) in a fluid, an indirect procedure is used whereby total carbon (TCA) is measured by a part of the system employed, and total inorganic carbon (TIC) by another. The total organic carbon content (TOC) is then determined by subtraction. In the determination of total carbon several methods can be used and instruments embodying such methods are commercially available e.g. Beckman Instruments Inc. "Carbonaceous Analyzer"[1] and Union Carbide Corporation Total Carbon Analyzers Model 1212 and 1202. The aforementioned devices function by periodically injecting a measured quantity of sample water onto a hot catalyst or into a rapid combustion chamber wherein all carbon bearing materials are converted to $CO_2$. This newly formed gaseous component is then swept by a carrier gas into a sensing system (usually a nondispersive infrared analyzer sensitized for $CO_2$) with the analyzer output signal being displayed by a recording or indicating device.

When a second channel is provided which is sensitized to inorganic compounds only, a further set of information is obtained. This "Total Inorganic" channel (TIC) usually involves a lower temperature reaction chamber which employs a catalyst such as zinc chloride. Again, a measured quantity of water is periodically injected onto the heated catalyst and vaporized; the inorganic components generating the product $CO_2$ in direct proportion to the number of carbon atoms they represent. Organic components are not affected. The resulting $CO_2$ gas is then swept into a detecting device, such as a non-dispersive infrared analyzer sensitized for $CO_2$, and the signal output displayed as before noted.

The two readings of generated $CO_2$ obtained are usually scaled by conventional calibration procedures to read "parts per million" (p.p.m.) by weight directly. The difference between the two readings then yield the quantity of p.p.m. of total organic carbon (TOC) i.e.

$$TOC = TCA - TIC$$

The present state of the art has made possible the manufacture of reliable, automatic instruments for measuring "total carbon" (TCA). These instruments provide long periods of accurate operation without need for repair or other attention. However, systems for measuring the total inorganic carbon (TIC) suffer from a fundamental problem in that the acids or salts employed as the catalyst are

[1] Trademark of Beckman Instruments Inc.

water soluble and tend to be "washed away" fairly rapidly by the water sample being analyzed and by the application, if used, of rinsing fluid. The operating "lifetimes" of such devices range from several days to two or three weeks.

It is therefore an object of the present invention to provide a method for replenishing the catalyst used in instruments for total inorganic carbon measurements to thereby increase the life of such instruments indefinitely.

Other objects will be apparent from the following description and claims taken in conjunction with the drawing wherein FIG. 1 shows, somewhat schematically, apparatus, including a metering valve, suitable for the practice of the present invention.

Figure 2:
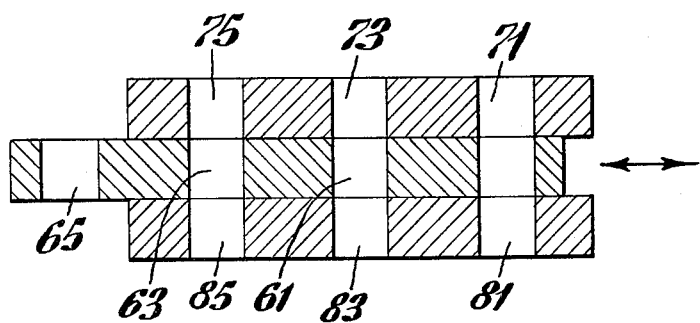

FIG. 2 shows the metering valve of FIG. 1 at a different time and in an alternate position.

The present invention comprises a novel method for extending the life of catalytic converters which are presently employed in measuring the total inorganic carbon content of a water sample. The method of the present invention involves the addition of a sufficient quantity of water soluble catalyst to the rinse water normally used with such instruments to replenish the catalyst lost during each measurement. Additional stabilizing agents may also be added to the rinse water.

With reference to the drawing FIG. 1 shows a flow selector valve arrangement 10 for providing the injection of a measured carbon-containing water sample into a reaction chamber 20 which communicates with a gas-liquid separator 30 from which $CO_2$ gas, generated in reaction chamber 20, is passed to infrared analyzer 40. The measurement provided by analyzer 40 is recorded by a conventional recorder shown at 50. A rinsing solution is provided in reservoir 55 and communicates with valve arrangement 10 via conduit 57.

With the apparatus of FIG. 1, which schematically represents a device of measuring total inorganic carbon, a small side stream of water is taken from the main sample stream 60 and passes through control valve 70 to flow selector valve 10 which is shown as a conventional sliding plate valve embodiment which can be pneumatically actuated to provide motion of sliding plate 80 in the directions indicated. Sliding plate 80 contains precisely dimensioned passages 61, 63 and 65 which communicate respectively, as shown in FIG. 1 with ports 71, 73 and 75 in upper valve body portion 90 and ports 81, 83 and 85 in lower valve body portion 100. When sliding plate 80 of valve 10 is actuated to move to the left as represented in FIG. 2, a precise quantity of the sample stream flowing through passage 61 is placed in communication with carrier gas stream 110, which can be nitrogen supplied from tank 120, whereby the precise water sample is injected into reaction chamber 20. In the reaction chamber 20, the water sample is vaporized and the total inorganic carbon component of the sample is converted by the action of catalyst 130 to $CO_2$. The $CO_2$ evolves through conduit 140, through gas-liquid separator 30 and into analyzer 40. The measurement provided by analyzer 40 is recorded at 50 as previously described. Sliding plate 80 is actuated to return to the original position of FIG. 1 and as a result, carrier gas from pressurized tank 120 flushes a precise quantity of rinse water in passage 63 into reaction chamber 20 in order to remove components of the previous sample that may have adhered to the surfaces leading to the reaction chamber 20.

In the practice of the present invention, the rinse water provided from reservoir 55 is a solution of material corresponding to the catalyst material 130 in reaction chamber 20. Thus, concurrently with flush cleaning of the reaction chamber 20, a precise quantity of catalyst material is placed in contact with the heated catalyst 130. As shown in the drawing the catalyst 130 is supported and confined by porous elements 153 and 155 which can be in the form of pads of "Fiberfrax" or other suitable materials. The catalyst is maintained at an elevated temperature of about 220° C. to 300° C. by heating means which can be an oven or heating tape as indicated at 150 and having terminals at 152. The contacting of the heated catalyst with catalyst solution results in vaporization of the rinse water and the deposition of additional catalyst material onto the existing catalyst which compensates for the amount of catalyst previously dissolved by the water sample being measured. In the practice of the present invention various materials are suitable as catalysts e.g. phosphoric acid, zinc chloride, aluminum chloride, and other non-volatile acids and acidic salts and their combinations, e.g., sulphuric acid, ammonium bisulphate, zinc sulphate heptahydrate, benzoic acid, adipic acid, alpha-naphthoic acid, trans-cinnamic acid, terephthalic acid and toluic acid. Solutions of the respective materials can be used as rinsing fluids and are employed as additives whereby adequate replenishment of catalyst is obtained.

In a specific and preferred embodiment of apparatus for practicing the invention, the reaction chamber 20 is formed from a 15 inch length of ⅜ inch ID tube of corrosion resistant metal. A ⅛ inch pad of "Fiberfrax"[2] material 155 is tamped in the tube at a position 7¼ inches from the top to act as a support for the catalyst. Finely divided zinc chloride catalyst is then introduced to provide a depth of 4½ inches atop the Fiberfrax[2] as shown at 130. Another ⅛ inch spacer of "Fiberfrax"[2] 155 is tamped in at this point to inhibit channeling, and a final ½ inch of finely divided catalyst material is poured atop this spacer. Thus, a total active length of 5 inches of catalyst is available to promote the conversion of inorganic carbon to $CO_2$. The reaction chamber is wrapped with heating tape shown at 150 so that the active length of the reaction chamber is heated to 260° C. It is understood that the dimensions detailed for the chamber are approximate and can be varied without serious degradation of system performance. For example, the height of the catalyst may vary over several inches, while the temperature can be adjusted from about 220° C. upwards. The heater tape or furnace is powered at 30 watts from a stable electric power source comprising a solid-state variable power supply transformer and a voltage stabilizer.

A pneumatically actuated sliding plate valve substantially similar to one described hereinabove is provided for flow selector control. Distilled water with dissolved zinc chloride and HCl additive is used as the rinsing liquid. A commercially available infrared analyzer selectively sensitized to carbon dioxide is used as analyzer 50. An instrument air supply regulated at 20 p.s.i.g. provides the actuating medium for valve 10. The entire arrangement of apparatus is controlled by a timer comprising an electric motor geared to a set of cams which actuate microswitches which in turn operate solenoid valves in the pneumatic and system flow control lines.

EXAMPLE I

With the aforedescribed apparatus arrangement and an analyzer recorder capable of 0–5 millivolt full scale deflection, nitrogen was connected as the carrier gas and adjusted to a 0.08 cubic centimeter per minute flow rate. To calibrate the apparatus, known parts per million concentrations of sodium bicarbonate to provide inorganic carbon were introduced and yielded the following:

CALIBRATION DATA

Added (known) carbon concentration, p.p.m. sodium bicarbonate ------------------------------------- 100
Chart divisions ------------------------------------ 72.5
Approximate recorder, millivolts ----------------- 3.63

To determine reliability, automatically repetitive runs were made every 5 minutes for ten weeks, each with an introduction of 100 p.p.m. of sodium bicarbonate.

A rinse solution of 0.1 cc. of distilled water containing dissolved zinc chloride was used following each run. The rinse solution contained 68 grams of zinc chloride per 100 cc. of water; ten drops of HCl per 100 cc. of water were also added (the HCl addition is to reduce the pH of the rinse solution to about pH 3 or 4 to avoid hydrolyzation of the zinc chloride). The long term reliability of the catalyst was indicated by 10 weeks of continuous running time after which the experiment was terminated without failure of the zinc chloride catalyst reaction chamber. The indications obtained for each of the tests was 72.5±2% chart divisions.

What is claimed is:

1. In the method of measuring the amount of inorganic carbon in an aqueous solution involving the steps of (1) contacting a water soluble catalytic mass with a sample of the solution to be measured at elevated temperature whereby the solution is vaporized and the inorganic carbon content thereof converted to carbon dioxide and (2) thereafter washing the catalytic mass by contacting the same with a rinsing fluid, the improvement which comprises employing as the rinsing fluid an aqueous solution of material corresponding to the catalytic mass whereby the water of the solution is vaporized on contact with the catalytic mass and material corresponding to the catalytic mass is deposited thereon.

2. A method in accordance with claim 1 wherein the catalytic mass is a material selected from the group consisting of ammonium bisulphate, sulfuric acid, zinc sulphate heptahydrate, benzoic acid, adipic acid, alphanaphthoic acid, trans-cinnamic acid, terephthalic acid and toluic acid and wherein the rinsing fluid is an aqueous solution of the selected material.

3. A method in accordance with claim 1 wherein the catalytic mass is zinc cholride and the rinsing fluid is an aqueous solution of zinc chloride.

References Cited

UNITED STATES PATENTS

| | | | |
|---|---|---|---|
| 3,258,430 | 6/1966 | Odland | 252—411 R |
| 3,346,342 | 10/1967 | Miller | 23—253 |
| 3,492,094 | 1/1930 | Tjebbes et al. | 23—230 |
| 3,560,156 | 2/1971 | Teal et al. | 23—230 PC |

JOSEPH SCOVRONEK, Primary Examiner

R. E. SERWIN, Assistant Examiner

U.S. Cl. X.R.

23—253 PC; 252—411 R

---
[2] Trademark of Carborundum Co.